United States Patent [19]

Tackett et al.

[11] Patent Number: 5,168,145
[45] Date of Patent: Dec. 1, 1992

[54] PLASTIC FIBER OPTIC TERMINATOR

[75] Inventors: Timothy N. Tackett, Warren; Robert E. Steele, Cortland, both of Ohio

[73] Assignee: General Motors Corporation, Detroit, Mich.

[21] Appl. No.: 751,828

[22] Filed: Aug. 30, 1991

[51] Int. Cl.⁵ .............................................. G02B 5/14
[52] U.S. Cl. .................................... 219/243; 219/227; 156/359; 156/499; 156/579; 264/1.5; 385/95
[58] Field of Search ............... 219/243, 227, 228, 240, 219/241, 221, 505; 156/359, 499, 579, 423; 264/1.5; 425/11-12, DIG. 13; 65/4.2; 385/95, 97-98

[56] References Cited

U.S. PATENT DOCUMENTS

| | | | |
|---|---|---|---|
| 3,539,766 | 11/1970 | Eder | 219/228 |
| 3,925,139 | 12/1975 | Simmons | 219/243 |
| 4,093,491 | 6/1978 | Whelpton et al. | 219/241 |
| 4,168,109 | 9/1979 | Dumire | 385/60 |
| 4,349,497 | 9/1982 | Blackington | 264/1.5 |
| 4,468,555 | 8/1984 | Adachi et al. | 219/241 |
| 4,510,005 | 4/1985 | Nijman | 156/579 |
| 4,714,513 | 12/1987 | McAlister | 219/228 |

FOREIGN PATENT DOCUMENTS

| | | | |
|---|---|---|---|
| 60-15241 | 4/1985 | Japan | 264/1.5 |
| 60-79301 | 5/1985 | Japan | 264/1.5 |
| 61-94009 | 5/1986 | Japan | |

Primary Examiner—Teresa J. Walberg
Assistant Examiner—John A. Jeffery
Attorney, Agent, or Firm—Francis J. Fodale

[57] ABSTRACT

Portable apparatus is provided for terminating a plastic fiber optic cable mounted in a terminal connector by melting the fiber ends to form a smooth, flat end surface on each. The apparatus comprises a housing having a pistol grip, a holder for positioning a connector with the fiber ends protruding therefrom, and a heater. A polished plate is mounted on a trigger-operated holder for movement between a biased position normally engaging the heater and a position engaging the fiber ends. A heater switch energizes the heater; a temperature detector senses when the heater has reached a predetermined high temperature and illuminates an L.E.D. The operator then actuates the trigger to move the plate into engagement with the fiber ends to melt them. When the plate has cooled to a predetermined low temperature, indicating that the fiber ends are solidified, the L.E.D. extinguishes and the trigger can be released. A spring then moves the plate back into contact with the heater and the connector can be removed.

22 Claims, 2 Drawing Sheets

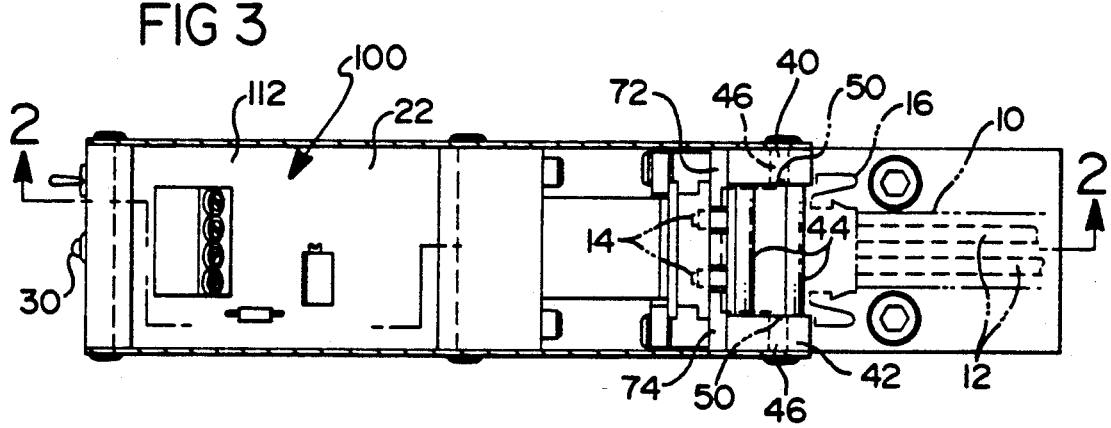
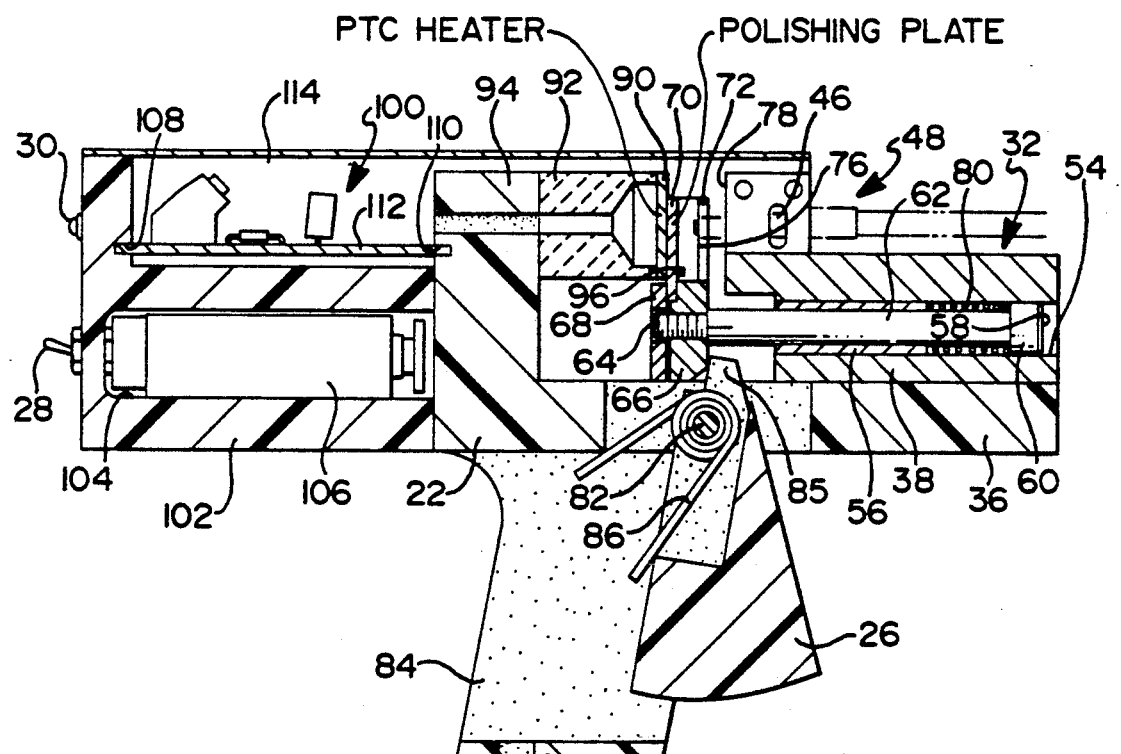
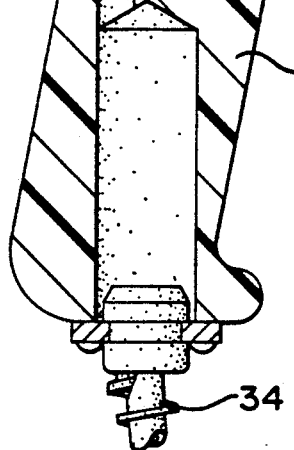

PLASTIC FIBER OPTIC TERMINATOR

BACKGROUND OF THE INVENTION

This invention relates generally to fiber optic cables and, more particularly, to apparatus for terminating plastic fibers in such cables.

Originally, glass was the sole material used as optical fibers. Recently, plastic optical fibers have gained widespread acceptance, especially for use in data transmission. Optical fibers used for data transmission are supplied in cable form in which the cable comprises a pair of plastic fiber cores, each with a thin cladding, and a protective jacket which can include strengthening members. Connecting the fiber optic cable to another device, such as an electro/optic device or another cable, requires the formation of a terminal on the cable. The termination of the cable is often performed as a field operation, such as when installing data transmission systems, such as computer LANs (Local Area Networks). The terminal installer normally encounters the ends of fiber optic cables extending from the wall of an office.

To provide an optically efficient interface between an optical fiber and another device, it is necessary to mount the optical fiber ends in a suitable terminal fitting in a manner that will provide good signal transmission across the interface. This requires that the optical fibers have a flat, smooth end surface. Two methods of forming this end surface during termination are in general usage.

In one, the "polishing" method, the cable jacket is stripped and the clad fiber is epoxied into an end fitting, such as a ferrule or a multiple fiber connector. The fiber end is snipped off to form a generally flat surface near the terminal face of the end fitting. This surface is then polished to a predetermined degree of smoothness to eliminate pits which adversely affect light transmission. This polishing method is a laborious, exacting and, thus costly, process which requires repeated visual inspection to determine when the predetermined degree of smoothness is achieved.

The other "hot plate" method involves stripping the cable jacket, inserting the fiber into an end fitting and projecting it through the exit aperture beyond the terminal face of the fitting. The fiber end is then snipped off a predetermined short distance beyond the terminal face. The fiber ends are brought into contact with a smooth plate, which is then heated to melt the fiber ends. Heat is then removed from the plate, which begins cooling. When plate has cooled sufficiently to solidify the fiber ends, they are removed from the plate. This "hot plate" method leaves the fiber end with the same smooth, flat surface as the plate.

Both of the termination methods described are time consuming and inefficient and utilize apparatus that is awkward to use in the field. The polishing method requires that the terminal installer determine when a sufficiently smooth polished end surface has been attained and requires repeated inspection. The hot plate method requires close attention by the operator who must judge when to remove heat. Otherwise the fibers will be overheated, and begin melting beyond their terminal faces, causing fiber distortion which will severely degrade light transmission. The hot plate method also requires judgment as to fiber perpendicularity to the plate surface and as to when the plate has cooled sufficiently to enable removal of the fiber from the plate.

Thus there is a need for apparatus that can be utilized in the field to reliably terminate a plastic optical fiber with a flat, smooth end surface.

There is a further need for such apparatus that is portable and easy to use.

There is a yet further need for such apparatus that minimizes the need for human judgment, while providing a reliably flat, smooth plastic optical fiber end surface.

SUMMARY OF THE INVENTION

It is therefore an object of this invention to provide apparatus that can be utilized in the field to reliably terminate a plastic optical fiber with a flat, smooth end surface.

Another object of this invention is to provide plastic optical terminating apparatus that is portable and easy to use.

A further object of this invention is to provide plastic optical fiber terminating apparatus that minimizes the need for human judgment, while providing a reliably flat, smooth plastic optical fiber end surface.

In one aspect, the preferred embodiment of this invention features apparatus for terminating the end of a plastic optical fiber which includes a heating unit that comprises a polished plate, a heater for heating the plate, a heater control for operating the heater to heat the plate to a predetermined temperature, and detection means for detecting when the plate has reached the predetermined temperature. A fiber holder positions a plastic fiber, and operating means are provided for engaging the heated plate with the fiber end when the plate has reached the predetermined temperature to terminate the end of the fiber.

In another aspect, the preferred form of this invention features portable apparatus for terminating the end of a plastic optical fiber which is contained in a housing having a handgrip. A heating unit is mounted in the housing and includes a polished plate, a heater for heating the plate, and a heater control for operating the heater to heat the plate to a predetermined terminating temperature. A holder positions the fiber in the housing. Operating means include a carrier mounting the plate in the housing for movement between positions engaging and disengaging the fiber end. A first spring moves the carrier to engaging position when the plate has reached the predetermined high temperature to terminate the end of the fiber. A second spring overcomes the first spring means to move the carrier to disengaging position when the plate has reached a predetermined low temperature. Disabling means are mounted in the housing adjacent the handgrip for selectively disabling the second spring to enable the first spring to move the carrier to engaging position.

In yet another aspect, the preferred form of this invention features a heating unit which includes detecting means for detecting and indicating when the plate has reached the predetermined high temperature and for detecting and indicating when the plate has reached the predetermined low temperature. The heating unit includes a positive temperature coefficient thermistor heater which automatically limits its temperature when energized.

In its preferred form, this invention features a method of terminating the plastic optical fibers in a terminal connector by mounting the connector in a portable apparatus which includes a movable polished plate, a heater for the plate, a plate temperature indicator, a pistol grip and actuating trigger; switching on a heater to heat a polished plate; grasping the apparatus by its pistol grip; actuating the trigger to engage the heated plate with the fiber ends upon indication that the plate has reached a predetermined high temperature; releasing the trigger to disengage the fibers from the plate upon indication that the plate has reached a predetermined low temperature; and removing the connector from the housing.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 2 is a longitudinal sectional view of the apparatus of FIG. 1, illustrated with the housing cover removed and with a fiber optic connector and cable shown inserted;

FIG. 3 is a plan view of the apparatus of FIG. 1; and

DETAILED DESCRIPTION OF A PREFERRED EMBODIMENT

Figure 1:
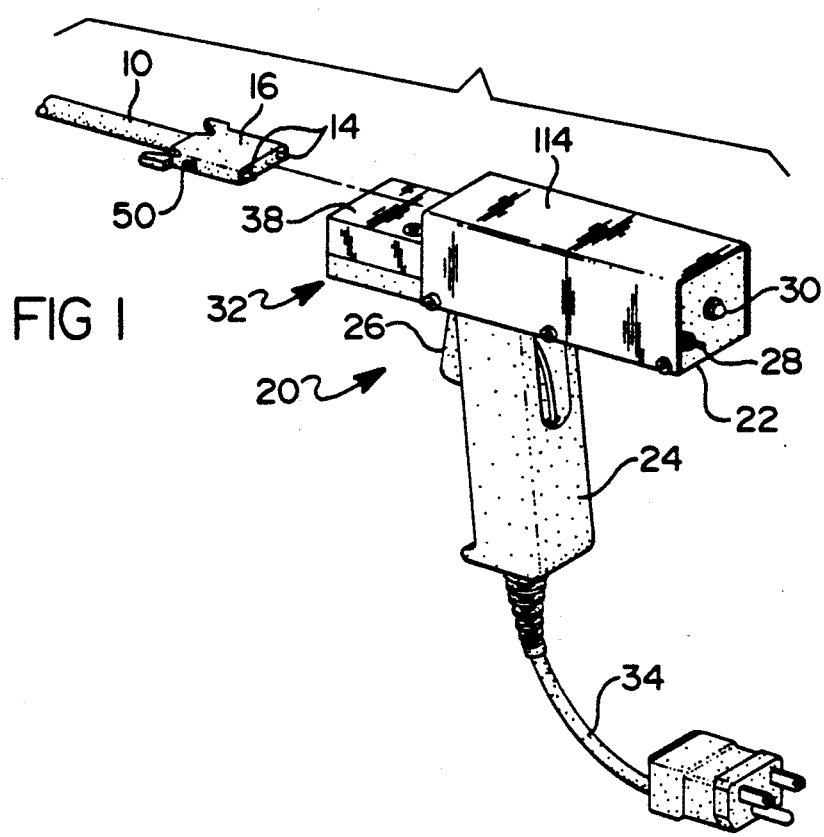
FIG. 1 is a perspective view of a plastic fiber optic cable and connector and a portable apparatus for terminating the cable fiber ends in the connector, according to this invention.

Referring to FIGS. 1 and 3 of the drawings, a plastic fiber optic cable 10 carries a pair of plastic optical fibers 12, the ends 14 of which protrude from the end of a terminating connector 16. The cable and connector are preferably of the type commercially available from Packard Electric Division of General Motors. Such cables are commonly utilized for data transmission and, as such, are wired through building walls and ceilings. Thus, the terminating connectors must be applied to the cable ends in the field when the wiring is completed.

To assure good signal transmission across the interface at the terminal, a flat, smooth surface must be formed on the ends of the fibers. To consistently provide the requisite surface, Applicants have provided a portable terminating apparatus in the form of a gun, generally designated 20, which includes a main body or housing 22 having a depending handgrip in the form of pistol grip 24 and an adjacent actuating trigger 26. Main body 22 mounts a heater control toggle switch 28 and a temperature indicator light 30 at its butt end, and includes a connector holder 32 at its barrel end. A power cord 34 extends from grip 24 and provides household current to a heater, described later.

Operation to terminate fiber ends 14 in connector 16 is quite simple. Switch 28 is operated to energize a heater, later described; the connector 16 then is placed in holder 32. When light 30 illuminates, trigger 26 is pulled and held until light 30 extinguishes; then connector 16 is removed with the fiber ends 14 having the requisite flat, smooth end.

Details of construction will now be described with reference to FIGS. 2 and 3 of the drawings. Housing 22 and grip 24 are preferably formed as a unit from ABS or other strong, heat resistant plastic. Connector holder 32 has a base 36 formed integrally with housing 22.

An aluminum block 38 is bolted to holder base 36 and has a pair of upstanding, spaced ears 40, 42. A pair of spaced rods 44 extend between ears 40, 42. Ears 40, 42 each contain identical vertical slots 46. Rods 44 and ears 40, 42 are spaced to define an aperture 48 for snugly receiving connector 16, as shown in phantom lines, with connector locking tangs 50 engaging in slots 46 to lock the connector in place.

Holder base 36 further includes a longitudinal bore 54 that receives a sleeve 56. A bolt 58 has a head 60 slidingly received in bore 54 and a shank 62 slidingly received in sleeve 56. The distal end 64 of bolt 58 threadedly engages a rectangular plate holder 66. A clamping member 68 is bolted to plate holder 66 to clamp a polishing plate 70 to plate holder 66. Plate holder 66 and clamping member 68 are also made of a strong, heat resistant plastic. Polishing plate 70 is preferably made of fused quartz, but may alternatively be of stainless steel.

Plate holder 66 has a pair of upstanding ears 72, 74 that form with the base of plate holder 66 a planar contact surface 76. Holder base 36 and its ears 40, 42 likewise form a complementary contact surface 78. A compression spring 80 encircles bolt shank 62 and is confined between the inner ends of bolt head 60 and sleeve 56. Spring 80 biases plate holder forwardly of gun 20 with contact surfaces 76 and 78 in engagement.

Trigger 26 is pivoted by a pin 82 to housing 22 forwardly adjacent grip 24, which includes a channel 84 permitting movement of trigger 26 inwardly of grip 24. Trigger 26 includes an upstanding actuating finger 85 which engages plate holder contact surface 76. A torsion spring 86 is captured by pin 82 and biases trigger 26 outwardly of grip 24.

A thermistor heater 90 is mounted on a ceramic insulating block 92 which is bolted to a wall 94 extending upwardly from housing 22. Heater 90 is connected through switch 28 to power cord 34 which supplies household current (120 volt a.c.). Heater 90 is mounted to be coplanar with polishing plate 70 to assure full contact with plate 70. Heater 90 is preferably a positive temperature coefficient (PTC) thermistor heater of the nonlinear type.

Trigger spring 86 is stronger (e.g. 4.5 kg) than spring 80 (e.g. 3 kg) so that polishing plate 70 normally engages heater 90. Pulling trigger 26, to stress spring 86, frees spring 80 to move plate holder 66 into engagement with connector holder contact surface 78. Releasing trigger 26 enables spring 86 to overpower spring 80 and return holder to its position engaging polishing plate 70 with heater 90. The length of trigger 26 and the contact point with spring 86 are preferably chosen to keep trigger effort low (e.g. 1 kg or less).

A resistance temperature detector 96 is glued by thermally-conductive epoxy to the outer face of polishing plate 70 to detect its temperature. Detector 96 is connected by circuitry 100, later described, to indicator light 30, preferably an L.E.D., which together comprise temperature detection means.

Details of operation follow. Switch 28 is operated to energize heater 90. Connector 16 is inserted into aperture 48 until tangs 50 lock into slots 46, with fiber ends extending beyond the end of connector 16, as illustrated in FIG. 2. When detector 96 has sensed that heater 90 has heated polishing plate 70 to a predetermined high temperature (e.g. 135° C.), light 30 will illuminate. Trigger 26 can then be pulled to contact plate 70 with the fiber ends 14, which will be melted.

When plate 70 has cooled to a predetermined low temperature (e.g. 100° C.), detector 96 will cause light 30 to extinguish. Trigger 26 can then be released to shift plate 70 out of contact with fiber ends 24 and back into contact with heater 90. Connector 16 can now be removed with its fiber ends 14 having the same flat, smooth finish as plate 70. Components are chosen and designed to preferably keep cycle time (time to cool until the light extinguishes) to one minute or less.

The circuit for operating indicator light 30 will now be described. The butt end of housing 22 includes a base 102 of the same material as housing 22 and is bolted to it. Base 102 includes a chamber 104 housing a 9 volt battery 106 for powering circuit 100 and wiring for battery 106 and switch 28. Base 102 has a pair of opposed slots 108, 110 which receives a circuit board 112 which mounts circuit 100. A removable aluminum cover 114 is bolted over housing 22 as illustrated.

Figure 4:
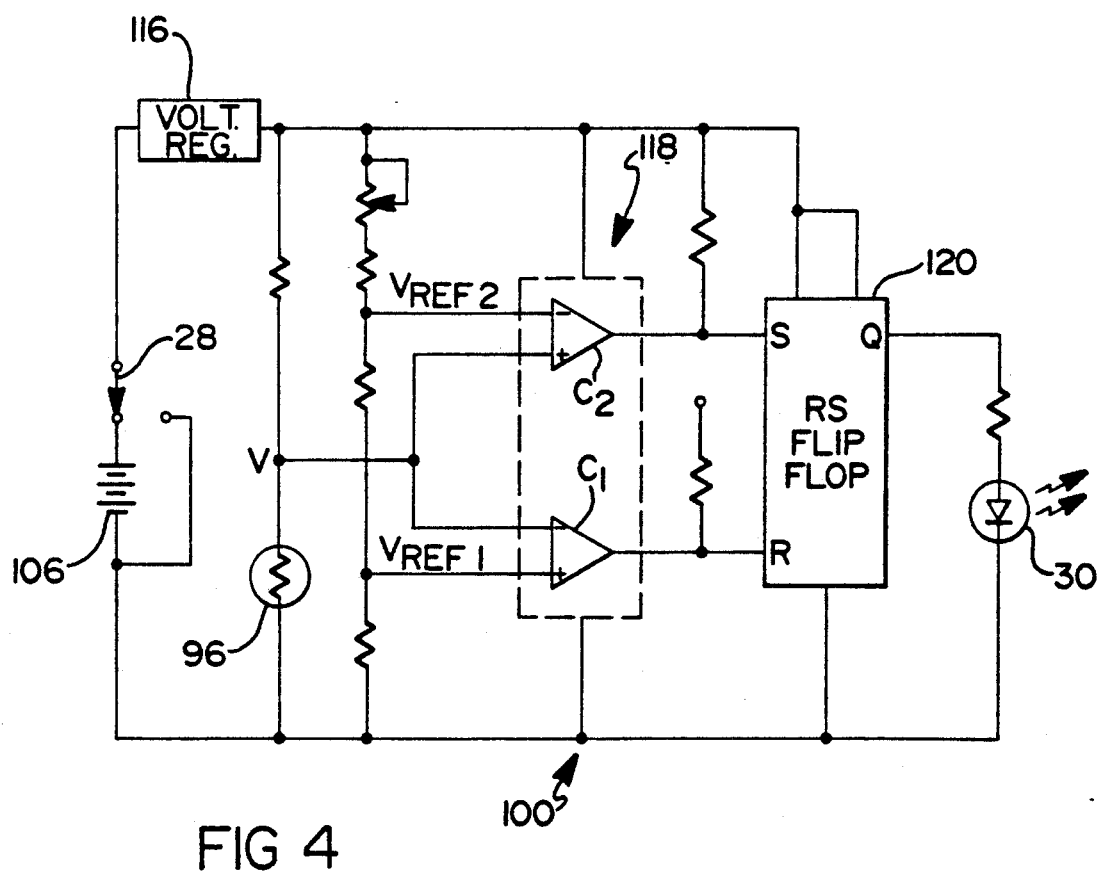
FIG. 4 is a schematic diagram of the temperature indicating circuit of FIG. 1.

Referring now to FIG. 4, circuit 100 comprises battery 106, switch 28, a voltage regulator 116, temperature detector 96, a dual comparator 118, an RS flip-flop 120, the output L.E.D. signal light 30 and resistors, a potentiometer and interconnecting circuitry as illustrated. The dual comparator 118 comprises comparators $C_1$ and $C_2$, While flip flop 120 has inputs R and S and an output Q.

In operation, when switch 28 is operated to energize the heater, it also energizes circuit 100. At this point polishing plate 70 is at ambient temperature, as sensed by detector 96. This causes voltage V to be less than $V_{ref1}$ and $V_{ref2}$. Thus, the output of $C_1$ is high (e.g. 5 v) and that of $C_2$ is low (e.g. 0 v). This puts flip-flop 120 in a reset state, with low voltage at output Q, which keeps L.E.D. 30 extinguished.

As heater 90 heats plate 70 rises (e.g. past 100° C.), V increases until it is greater than $V_{ref1}$, but less than $V_{ref2}$. This causes both the R and S inputs of flip-flop 120 to be low, With output Q retaining its low state and L.E.D. 30 remaining extinguished.

When the temperature of plate 70 increases sufficiently (e.g. above 135° C.), V exceeds both $V_{ref1}$ and $V_{ref2}$, the output of $C_1$ is high, and the output of $C_2$ is low. This sets flip-flop 120 so that output Q is high, which illuminates L.E.D. 30. This provides a visual signal to the operator of gun 20 that the plate 70 is hot enough to melt the fiber ends 14. When trigger 26 is pulled, plate 70 moves away from heater 90 and contacts fiber ends 14 to begin melting them.

Plate 70 must be kept in contact with fiber ends 14 until the plate cools sufficiently to enable the fiber ends to solidify. As the temperature of plate 70 drops (e.g. below 135° C.), V decreases below $V_{ref2}$, but above $V_{ref1}$, causing $C_1$ and $C_2$ and inputs S and R to be low. Flip-flop output Q remains low and L.E.D. 30 remains illuminated. During this period (the cycle time), trigger 26 must remain depressed to keep plate 70 in contact with the fiber ends 14.

When plate 70 cools sufficiently (e.g. below 100° C.), V drops below both $V_{ref1}$ and $V_{ref2}$. This causes the output of $C_1$ and input R to be high and the output of $C_2$ and input S to be low. This puts flip-flop 120 in a reset state with a low output at Q which extinguishes L.E.D. 30. This indicates to the operator that the termination process is complete, enabling the release of trigger 26 to return plate 70 into contact with heater 90.

The finished connector 16 can now be removed from the terminating apparatus 20 and replaced with another connector to be terminated. When plate 70 is hot enough, L.E.D. 30 will illuminate and the terminating process can be repeated.

While only a preferred embodiment of this invention has been illustrated and described, obvious modifications thereof are contemplated within the scope of this invention and the following claims.

We claim:

1. Apparatus for terminating the end of a plastic optical fiber, comprising
   a heating unit including a polished plate, a heater for heating the plate, a heater control for operating the heater to heat the plate to a predetermined high temperature, and detection means for detecting when the plate has reached the predetermined high temperature, and when the plate has cooled to a predetermined low temperature,
   a fiber holder for, positioning a plastic fiber, and
   operating means for engaging the heated plate with the fiber end when the plate has reached the predetermined high temperature to terminate the end of the fiber and for disengaging the cooled plate from the fiber end and returning the cooled plate into engagement with the heater when the plate has reached the predetermined low temperature.

2. The apparatus of claim 1, wherein the operating means include spring means normally engaging the fiber end with the plate and actuating means for overcoming the spring means to disengage the fiber end from the plate.

3. The apparatus of claim 2, wherein the actuating means include second spring means for overcoming the first spring means to disengage the fiber end from the plate, and disabling means for selectively disabling the second spring means to enable the first spring means to engage the fiber end with the plate.

4. The apparatus of claim 3, wherein the detection means include indicia means for indicating when the plate has reached the predetermined high temperature.

5. The apparatus of claim 4, wherein the heater is a positive temperature coefficient thermistor heater.

6. The apparatus of claim 1, wherein the detection means also detect when the plate has reached a predetermined low temperature.

7. The apparatus of claim 6, wherein the detection means include indicia means for indicating when the plate has reached the predetermined high temperature and for indicating when the plate has reached the predetermined low temperature.

8. The apparatus of claim 7, wherein the indicia means is a signal light that is illuminated when the predetermined high temperature is reached and is extinguished when the predetermined low temperature is reached.

9. Portable apparatus for terminating the end of a plastic optical fiber, comprising
   a housing having a handgrip,
   a heating unit mounted in the housing and including a polished plate, a heater for heating the plate, and a heater control for operating the heater to heat the plate to a predetermined high temperature,
   a holder for positioning the fiber in the housing, and operating means carried by the housing, including
   a carrier mounting the plate and the fiber holder in the housing for relative movement with respect to each other between positions engaging and disengaging the plate and the fiber end,
   first spring means for moving the carrier to engaging position when the plate has reached the predetermined high temperature to terminate the end of the fiber, second spring means for overcoming the first spring means to move the carrier to disengaging position when the plate has reached a predetermined low temperature, and disabling means mounted in the housing adjacent the handgrip for selectively disabling the second spring means to enable the first spring means to move the carrier to engaging position.

10. The apparatus of claim 9, wherein the heating unit includes detecting means for detecting and indicating when the plate has reached the predetermined high temperature and for detecting and indicating when the plate has reached a predetermined low temperature and a positive temperature coefficient thermistor heater.

11. Portable apparatus for terminating the end of plastic optical fibers mounted in a terminal connector, comprising a housing, a heating unit mounted in the housing and including a polished plate mounted for movement between first and second positions, a heater for heating the plate in first position, and a heater control for operating the heater to heat the plate to a predetermined high temperature, a holder for positioning a connector having the fiber ends protruding therefrom in the housing for engagement by the plate in second position, and operating means carried by the housing for moving the plate from first to second position to engage the fiber ends when the plate has reached the predetermined high temperature to terminate the ends of the fibers and for moving the plate to second position when the plate has reached a predetermined low temperature.

12. The apparatus of claim 11, wherein the operating means include spring means biasing the plate to first position.

13. The apparatus of claim 12, wherein the operating means include actuating means for overcoming the spring means to move the plate to second position.

14. The apparatus of claim 13, wherein the actuating means include second spring means for biasing the plate to second position with a force greater than the first spring means and disabling means for selectively disabling the second spring means.

15. The apparatus of claim 14, wherein the operating means include a carrier mounting the plate for movement between positions, and the disabling means is a lever mounted on the housing for actuation to move the carrier to second position against the force of the second biasing means.

16. The apparatus of claim 15, wherein the housing includes a handgrip, and the lever is mounted on the housing for manual actuation.

17. The apparatus of claim 15, wherein the housing includes a pistol grip and the lever is mounted on the housing adjacent the grip as a trigger for manual actuation.

18. The apparatus of claim 11, wherein the heating unit includes detecting means for detecting when the plate has reached the predetermined high temperature and for detecting when the plate has reached the predetermined low temperature.

19. The apparatus of claim 18, wherein the detecting means include indicia means for indicating when the plate has reached the predetermined high temperature and for indicating when the plate has reached the predetermined low temperature.

20. The apparatus of claim 19, wherein the indicia means is a signal light that is illuminated when the predetermined high temperature is reached and is extinguished when the predetermined low temperature is reached.

21. The apparatus of claim 11, wherein the heater is a positive temperature coefficient thermistor heater.

22. A method of terminating the plastic optical fibers in a terminal connector comprising the steps of mounting the connector in a portable apparatus which comprises a polished plate, a heater for the plate, a plate temperature indicator, a pistol grip, and an operating mechanism including a trigger, switching on a heater to heat the polished plate, grasping the apparatus by its pistol grip, actuating the trigger to engage the heated plate with the fiber ends when the indicator indicates that the plate has reached a predetermined high temperature, releasing the trigger to disengage the fibers from the plate when the indicator indicates that the plate has reached a predetermined low temperature, and removing the connector from the housing.

* * * * *